United States Patent [19]

Tarlow

[11] Patent Number: 4,953,452
[45] Date of Patent: Sep. 4, 1990

[54] COLLAPSIBLE STEAMER BASKET

[76] Inventor: Kenneth A. Tarlow, 138 Waterview, Playa del Rey, Calif. 90293

[21] Appl. No.: 252,175

[22] Filed: Sep. 30, 1988

[51] Int. Cl.$^5$ .......................................... A47J 27/212
[52] U.S. Cl. ...................................... 99/344; 99/418; 99/450; 116/221
[58] Field of Search ................ 99/418, 410, 285, 331, 99/337, 342, 344, 450, 415, 449; 219/264, 265; 116/216, 221, 148, 167, 109; D10/116; D7/47, 387

[56] References Cited

U.S. PATENT DOCUMENTS

| D. 163,468 | 5/1951 | Millard | D7/47 |
|---|---|---|---|
| 642,262 | 1/1990 | Sarles | D7/47 |
| 1,769,639 | 7/1930 | Gustafson | 116/109 X |
| 2,137,805 | 11/1938 | Mueller | 99/344 X |
| 2,667,117 | 1/1954 | Millard et al. | 99/450 |
| 2,712,295 | 7/1955 | Haynes | 99/344 X |
| 3,117,550 | 1/1964 | Cole | 116/221 |
| 3,781,521 | 12/1973 | Kirchner | 116/148 X |
| 4,138,939 | 2/1979 | Feld | 99/450 |
| 4,503,800 | 3/1985 | Schliep | 116/221 |
| 4,776,296 | 10/1988 | Heermans | 99/344 |

FOREIGN PATENT DOCUMENTS

| 210255 | 5/1909 | Fed. Rep. of Germany | 99/449 |
|---|---|---|---|
| 689280 | 9/1930 | France | 99/418 |
| 2529068 | 12/1983 | France | 99/344 |
| 419098 | of 1947 | Italy | 99/449 |
| 383561 | 11/1932 | United Kingdom | 99/449 |

*Primary Examiner*—Philip R. Coe
*Assistant Examiner*—K. OLeary

[57] ABSTRACT

A collapsible steamer basket for insertion into the interior of a vessel. Vegetables or the like can be placed inside the basket and steamed. The basket has a plurality of foldable apertured leaves which overlap and conform to the interior of the vessel. A built-in signal device is provided for audibly signalling when the interior of the vessel reaches a predetermined temperature to avoid burning of the foods being steamed.

17 Claims, 2 Drawing Sheets

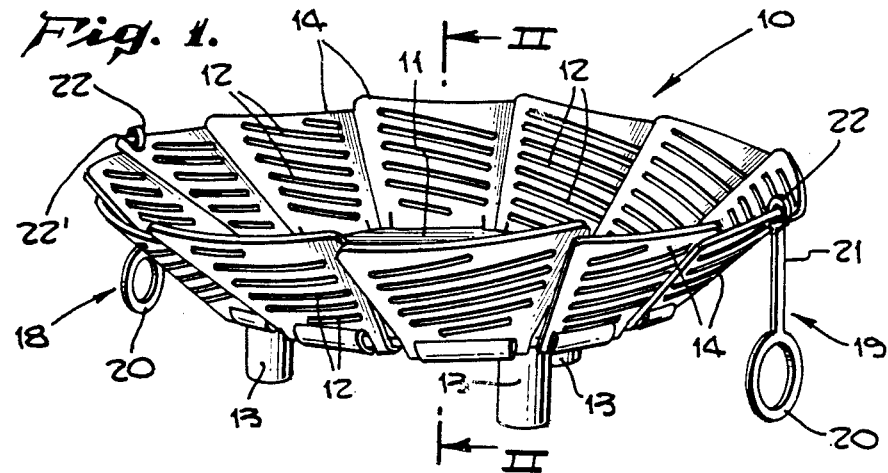
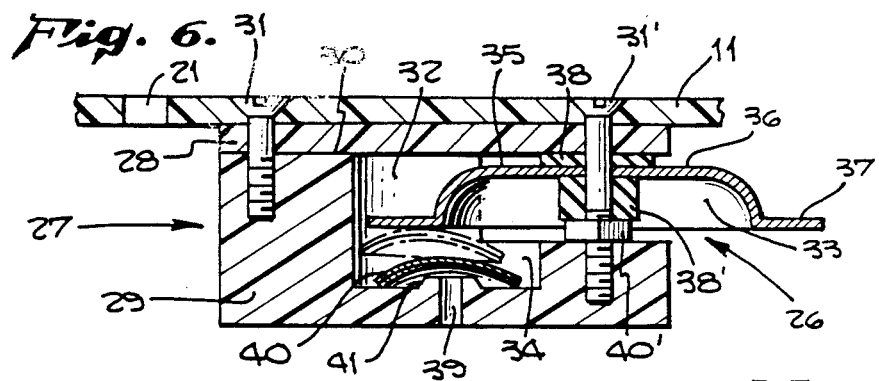
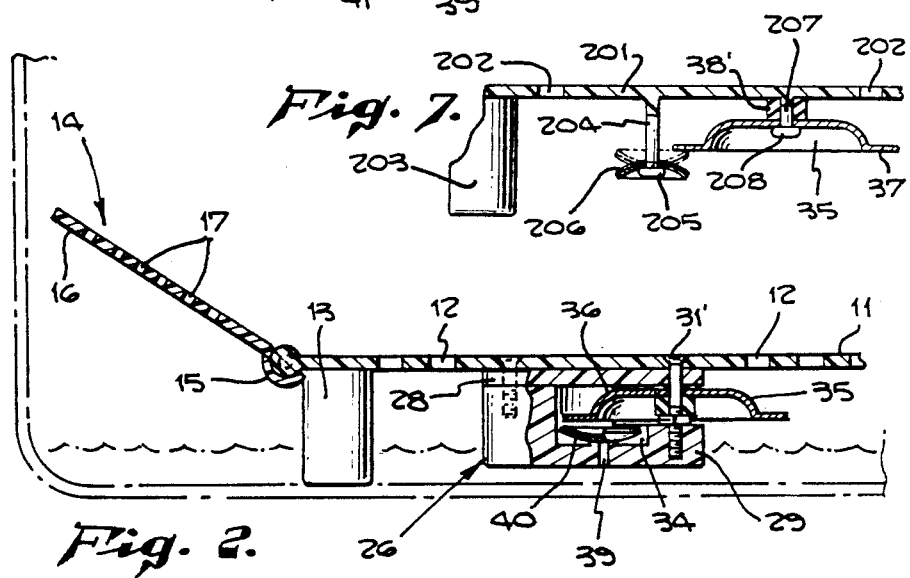

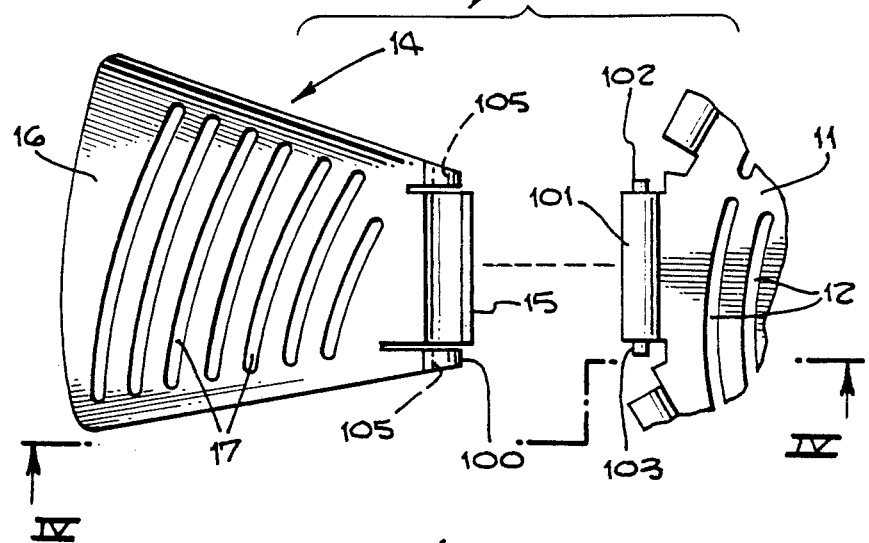
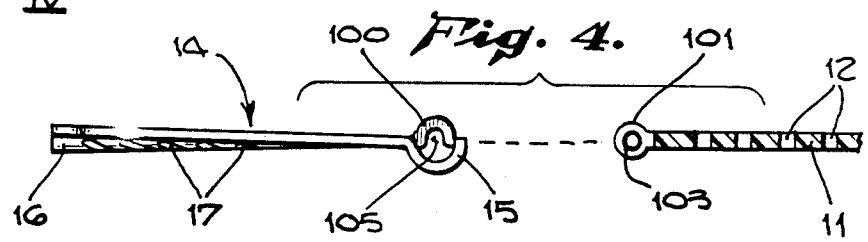
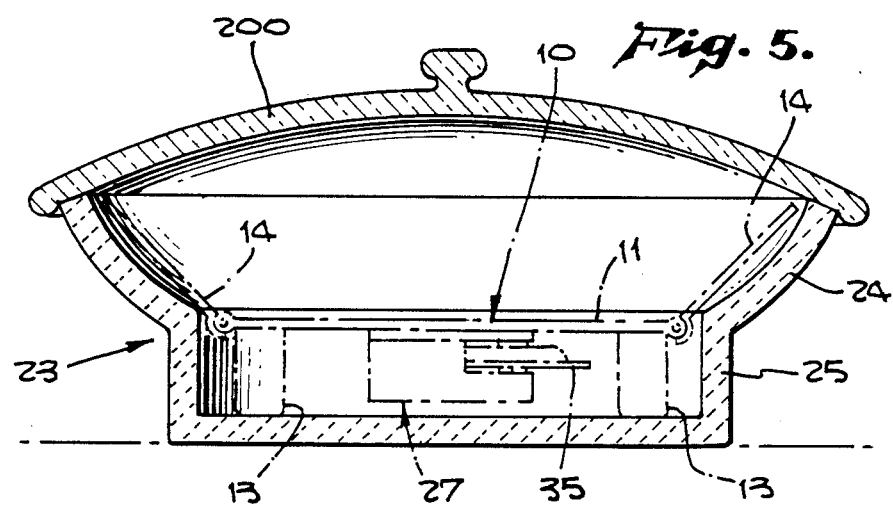

COLLAPSIBLE STEAMER BASKET

BACKGROUND OF THE INVENTION

1. Field of the Invention

The invention relates to collapsible steamer baskets; and, more particularly, to steamer baskets which conform to the interior of a vessel.

2. Description of the Prior Art

Collapsible steamer baskets are well known in the art. Generally speaking, such baskets have a plurality of interconnected overlapping perforated leaves which conform to the interior of the vessel. Two such baskets are shown in U.S. Pat. Nos. 2,667,117 and 4,138,939 to Millard et al and Feld, respectively.

However, it is necessary to watch the foods being steamed in such baskets since no means are provided for signalling when the water in the vessel has boiled away.

There thus exists a need for a collapsible steamer basket which has a plurality of interconnected overlapping apertured leaves which fold to conform to the interior of a vessel, yet is free standing when removed from the vessel and has a built-in audible signal for indicating when the boiling water in such vessels has boiled away.

SUMMARY OF THE INVENTION

It is an object of this invention to provide an improved collapsible steamer basket for steaming vegetables or the like.

It is a further object of this invention to provide an improved collapsible steamer basket which is self standing yet conforms to the interior of the vessel into which it is inserted.

It is still further an object of this invention to provide a collapsible steamer basket with a built-in audible signal indicating when the temperature encountered by the basket exceeds a predetermined temperature.

These and other objects are preferably accomplished by providing a collapsible steamer basket insertible into the interior of a vessel where vegetables or the like can be placed inside the basket and steamed. The basket has a plurality of foldable apertured leaves which overlap and conform to the interior of the vessel. A built-in signal device is provided for audibly signalling when the interior of the vessel reaches a predetermined temperature to avoid burning of the foods being steamed.

BRIEF DESCRIPTION OF THE DRAWING

FIG. 1 is a perspective view of a collapsible steamer basket in accordance with the teachings of the invention;

FIG. 2 is a view taken along lines II—II of FIG. 1;

FIG. 3 is a top plan exploded view of a portion of the basket of FIGS. 1 and 2;

FIG. 4 is a view taken along lines IV—IV of FIG. 3;

FIG. 5 is a vertical sectional view of a heating tray into which the basket of FIGS. 1 to 4 is mounted as seen in dotted lines;

FIG. 6 is a vertical sectional view of a portion of the basket of FIG. 2; and

FIG. 7 is a view similar to FIG. 6 showing a modification of the signal device of the embodiment of FIGS. 1 to 6.

DESCRIPTION OF THE PREFERRED EMBODIMENT

Referring now to FIG. 1 of the drawing, a collapsible steamer basket 10 in accordance with the invention is shown. Basket 10 has a base plate 11 having a plurality of arcuately curved apertures or slots 12 therethrough. As seen in FIG. 1, a plurality of spaced feet or supporting legs 13, such as three such legs, are fixedly secured to the underside of plate 11 and downwardly extending therefrom.

A plurality of overlapping leaves 14 are pivotally connected to base plate 11. As seen in FIG. 3, each leaf 14 has a lower arcuate flange 15 (see also FIG. 4) and a generally trapezoidally-shaped main body portion 16 having a plurality of arcuately configured slots 17 therethrough. Each leaf 14 overlaps with a succeeding leaf 14 as seen in FIG. 1.

A second arcuate portion 100 (FIG. 3) is provided on each leaf 14 slightly smaller in diameter than portion 15 (see FIG. 5) so that a circular elongated boss 101 (FIG. 3) at spaced locations along base plate 11 can snap-fit (compare with FIG. 4) into the opening found between portions 100, 15. The pegs 102, 103 at each end of cylindrical boss 101 snap into holes 104, 105, respectively (FIG. 3) on each side of the narrower end of each leaf 14.

A pair of handles 18, 19 may be provided, each handle having a ring 20 at its outer end and an elongated shaft 21 fixed to a small ring 22 looped into a hole 22' in one of the leaves 14 as seen in FIG. 1. Thus, the handles 18, 19 may be moved or pivoted about rings 22 and lifted via rings 20 to lift the entire basket 10 to carry the same. Ring 22 may be a split ring so that each handle 18, 19 is quickly and easily removable.

If desired, a heat proof imperforate tray, such as tray 23 (FIG. 5) may be provided having a flared upper body portion 24 and a lower generally cylindrical portion 25. Tray 23 may also be covered by a clear Pyrex glass lid 200, if desired. Tray 23 may also be of clear Pyrex glass. As seen in FIG. 5, the basket 10 is shown in dotted lines resting on the bottom of portion 25, the leaves 14 abutting against the inside wall of body portion 24. Thus, the angle of the inside wall of body portion 25 matches or conforms to the angle of the leaves 14 when in the FIG. 1 position. In this manner, basket 10 can be lifted via handles 18, 19, placed in tray 23 and tray 23 can thus be used as a serving tray.

Alternatively, basket 10 can be left in tray 23 and the steaming operation carried out therein and carried to the table or the like after steaming without need for removal of the basket 10 from tray 23.

As particularly contemplated in the present invention, audible signal means 26 are provided for providing an audible signal when the temperature encountered by basket 10 during steaming reaches a predetermined temperature. Thus, as seen in FIG. 6, a cymbal housing 27 is provided comprised of upper and lower sections 28, 29 joined at seam 30 in any suitable manner while forming a space therebetween. Housing 27 is secured to the underside of base plate 11 by suitable screws 31, 31' or the like. The spacing between upper and lower sections 28, 29 forms an enlarged bell chamber 32 leading from a narrow chamber 33. A lower cavity or chamber 34 is formed below bell chamber 32. A metallic cymbal 35 is provided having a concave bell portion 36, disposed within and conforming to bell chamber 32 and a round peripheral lip 37 or flange extending through chamber 33 and out of housing 27 as shown. The bell portion 36 of cymbal 35 is mounted by screw 31, to housing 27 with a resilient washer 38 between cymbal 35 section 28 to allow the cymbal 35 to "float" A resilient pad 38' is also provided between cymbal 35 and nut 40' threaded to the shaft of screw 31', the lower end thereof threaded to section 29. A hole 39 is provided in the bottom wall of lower chamber 34 to provide a drain. A bimetallic disk 40 is loosely mounted within chamber 34 of a diameter greater than the diameter or maximum width of hole 39 and domed or concavely shaped. The disk 40 can be placed within chamber 34 either as shown in FIG. 2 or as shown in FIG. 6. If desired, an annular rib 41 may be molded in chamber 34 surrounding opening or hole 39 to provide a support for disk 40.

Disk 40 is selected from a bimetallic material sufficient to snap at a predetermined temperature, such as 230° F., and, other than being domed, may be of any desired size or configuration. Leaves 14 may be at any desired angle when in the FIG. 1 position, such as 30° with respect to the horizontal. Any suitable materials may be used, such as ceramics for tray 23, rubber for washer 38, nylon 6/6 material for the leaves 14 and base plate 11, ceramics for feet or legs 13, etc. Thus, any suitable heat proof material capable of withstanding temperatures encountered during steaming may be used. Cymbal 35 may be about 2" in diameter and the diameter of housing 27 may be about 1¼" with disk 40 about 1" in diameter. The opening from chamber 34 to chambers 32, 33 is such that disk 40 can snap up from chamber 34 into contact with cymbal 35.

During operation, basket 10 is placed within a cooking vessel with water placed in the vessel. The foods to be steamed are placed in basket 10, the leaves 14 folding inwardly (if necessary) to accommodate basket 10 to the interior of the cooking vessel. The water is now brought to a boil, then set to simmer to steam the foods in basket 10. Should all of the water boil away, the temperature of the interior of the cooking vessel will swiftly climb. If it exceeds 230° F. or goes above the boiling point of water, disk 40 will snap upwardly from lower chamber 34 to abut against the rim or lip 37 of cymbal 35 to ring the same. This audible sound will alert the cook to turn off the cooking vessel or add more water to prevent burning.

The disk 40 will when return to its unsnapped position when the temperature drops below the predetermined temperature (e.g., 230° F.) and is thus ready to again sound an audible signal.

Another embodiment of a signal device is shown in FIG. 7 and the numerals refer to like parts of the embodiment of FIG. 6. Housing 27 has been eliminated and base plate 201, otherwise similar to base plate 11, has holes 202 therethrough with a support leg 203 (similar to leg 13 of FIG. 2). A vertical post 204 is provided extending downwardly from plate 201 having an enlargement or button 205 at the terminal end thereof. An apertured metallic disk 206, similar to disk 40, is mounted on post 204 and movable therealong. Note that disk 206 is downwardly concave. A second vertical post 207 is provided extending downwardly from plate 201 having an enlargement, such as button 208, at its terminal end. A cymbal 35, identical in all respects to the cymbal of FIGS. 1 to 6, is mounted on post 207 with resilient washer 38' between cymbal 35 and base plate 201.

Disk 206 rides on post 204 a short distance between button 205 and the bottom lip 37 of cymbal 35 (e.g., about ⅛" preferred). Disk 206 may be of the same material and dimensions as disk 40. The operation of disk 206 is identical to that of disk 40. If the temperature exceeds 230° F. or goes above the boiling point of water, disk 206 will snap upwardly as seen in dotted lines and strike lip 37 of cymbal 35 thus alerting the cook. Disk 206 will then return to its unsnapped or solid line position when the temperature drops.

The basket 10 can then be lifted via handles 18, 19 to tray 23 and the tray 23 containing basket 10 can be brought directly to the serving area.

It can be seen that there is disclosed an improved steamer basket which can quickly and easily steam foods and provide an audible signal if the water boils away.

Although I have disclosed a particular embodiment of the invention, variations thereof may occur to an artisan and the invention is to be limited only by the scope of the appended claims.

I claim:

1. A steamer basket comprising:
   a base plate having a plurality of spaced openings therein;
   a plurality of overlapping leaves pivotally connected to said base plate, each of said leaves having a plurality of spaced openings therein and interconnecting means between each of said leaves and said base plate for retaining each of said leaves and said base plate for retaining said leaves in a first fixed position at an angle with respect to the horizontal and allowing said leaves to pivot to a second position inwardly toward said base plate; and
   audible signal means associated with said base plate for providing an audible signal when the temperature encountered at said base plate exceeds a predetermined temperature, said audible signal means including a housing mounted to the underside of said base plate, said housing having an inner bell-shaped chamber with a cymbal resiliently mounted therein and a striker mounted in said housing for striking said cymbal when said predetermined temperature is exceeded, said cymbal having a bell-shaped portion with a flat annular ring, said ring extending out of said housing through an opening communicating with said bell-shaped chamber.

2. In the basket of claim 1 wherein said element is concave in configuration.

3. In the basket of claim 1 wherein said cymbal is resiliently mounted to said bell-shaped chamber by a fastener securing the bell-shaped chamber to said base plate with a resilient washer between said cymbal and said bell-shaped chamber.

4. A steamer basket comprising:
   a base plate having a plurality of spaced openings therein;
   a plurality of overlapping leaves pivotally connected to said base plate, each of said leaves having a plurality of spaced openings therein and interconnecting means between each of said leaves and said base plate for retaining said leaves in a first fixed position at an angle with respect to the horizontal and allowing said leaves to pivot to a second position inwardly toward said base plate; and
   audible signal means associated with said base plate for providing an audible signal when the temperature encountered at said base plate exceeds a predetermined temperature, said audible signal means including a housing mounted to the underside of said base plate, said housing having an inner bell-shaped chamber with a cymbal resiliently mounted therein and a striker mounted in said housing for striking said cymbal when said predetermined temperature is exceeded, said cymbal having a bell-shaped portion with a flat annular ring, said ring extending out of said housing through an opening communicating with said bell-shaped chamber, and a drain hole provided in said lower chamber.

5. In the basket of claim 4 including a raised annular rib in said lower chamber on which said element sits surrounding said drain hole.

6. A steamer basket comprising:
a base plate having a plurality of spaced openings therein;
a plurality of overlapping leaves pivotally connected to said base plate, each of said leaves having a plurality of spaced openings therein and interconnecting means between each of said leaves and said base plate for retaining said leaves in a first fixed position at an angle with respect to the horizontal and allowing said leaves to pivot to a second position inwardly toward said base plate; and
audible signal means associated with said base plate for providing an audible signal when the temperature encountered at said base plate exceeds a predetermined temperature, said audible signal means including a first vertical post extending downwardly from the underside of said base plate, said cymbal being resiliently mounted on said post, a second vertical post spaced from said first vertical post extending downwardly from the underside of said base plate, said striker being mounted on said second post in a position to contact said cymbal when said predetermined temperature is exceeded.

7. In the basket of claim 6 wherein said cymbal has a bell-shaped portion with a flat annular ring, said striker being loosely mounted on said second post.

8. In the basket of claim 7 wherein said cymbal is resiliently mounted to said base plate by a resilient washer on said first post between said cymbal and said base plate.

9. A steamer basket comprising:
a base plate having a plurality of spaced openings therein;
a plurality of overlapping leaves pivotally connected to said base plate, each of said leaves having a plurality of spaced openings therein and interconnecting means between each of said leaves and said base plate for retaining said leaves in a first fixed position at an angle with respect to the horizontal and allowing said leaves to pivot to a second position inwardly toward said base plate; and
audible signal means associated with said base plate for providing an audible signal when the temperature encountered at said base plate exceeds a predetermined temperature, said audible signal means including a housing mounted to the underside of said base plate, said housing having an inner bell-shaped chamber with a cymbal resiliently mounted therein and a striker mounted in said housing for striking said cymbal when said predetermined temperature is exceeded, said cymbal having a bell-shaped portion with a flat annular ring, said ring extending out of said housing through an opening communicating with said bell-shaped chamber.

10. In the basket of claim 9 wherein a lower chamber is provided in said housing communicating with said bell-shaped chamber and said striker is a bimetallic element preset to snap at said predetermined temperature loosely providing in said lower chamber.

11. In the basket of claim 10 including a drain hole providing in said lower chamber.

12. In the basket of claim 11 including a raised annular rib in said lower chamber on which said element sits surrounding said drain hole.

13. In the basket of claim 10 wherein said element is concave in configuration.

14. In the basket of claim 10 wherein said cymbal is resiliently mounted to said bell-shaped chamber by a fastener securing the bell-shaped chamber to said base plate with a resilient washer between said cymbal and said bell-shaped chamber.

15. A steamer basket comprising:
a base plate having a plurality of spaced openings therein;
a plurality of overlapping leaves pivotally connected to said base plate, each of said leaves having a plurality of spaced openings therein and interconnecting means between each of said leaves and said base plate for retaining said leaves in a first fixed position at an angle with respect to the horizontal and allowing said leaves to pivot to a second position inwardly toward said base plate; and
audible signal means associated with said base plate for providing an audible signal when the temperature encountered at said base plate exceeds a predetermined temperature, said audible signal means including a first vertical post extending downwardly from the underside of said base plate a cymbal resiliently mounted on said post, a second vertical post spaced from said first vertical post extending downwardly from the underside of said base plate, a striker mounted on said second post in a position to contact said cymbal when said predetermined temperature is exceeded.

16. In the basket of claim 15 wherein said cymbal has a bell-shaped portion with a flat annular ring, said striker being a bimetallic element preset to snap at said predetermined temperature loosely mounted on said second post.

17. In the basket of claim 16 wherein said cymbal is resiliently mounted to said base plate by a resilient washer on said first post between said cymbal and said base plate.

* * * * *